(No Model.)
T. C. MADDUX.
STEAM COOKER.
No. 567,858. Patented Sept. 15, 1896.
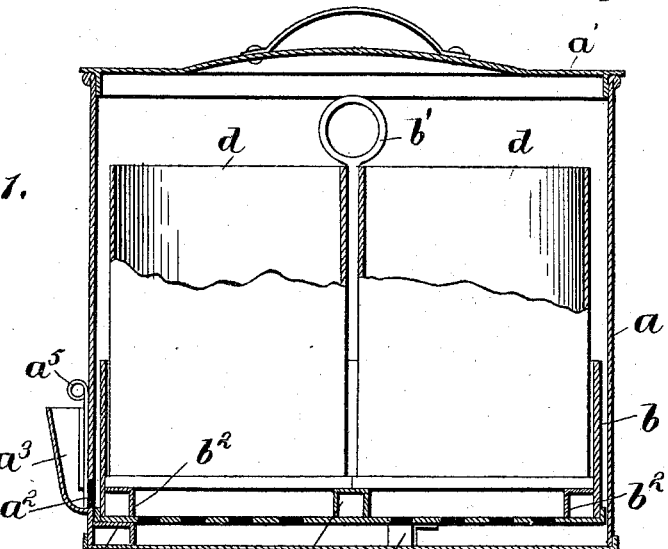
Fig. 1.
Fig. 2.
Fig. 3.
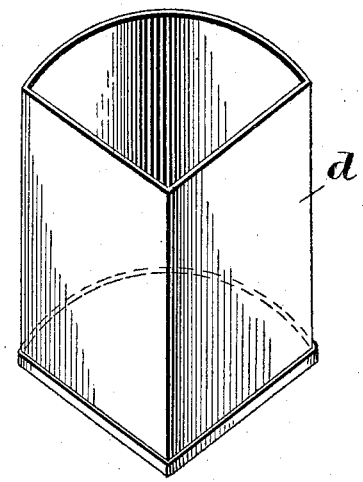
Fig. 4.
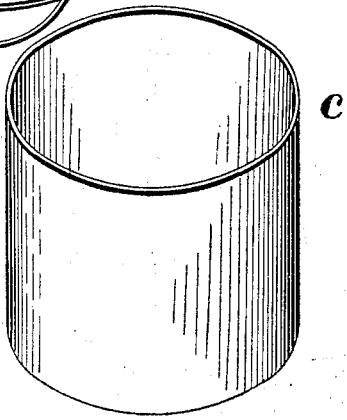
Witnesses
Geo. E. Frech.
James W. Evans
Inventor
Thomas C. Maddux,
by Hubert E. Peck
Attorney
THE NORRIS PETERS CO., PHOTO-LITHO., WASHINGTON, D. C.

UNITED STATES PATENT OFFICE.

THOMAS C. MADDUX, OF CARTHAGE, TENNESSEE.

STEAM-COOKER.

SPECIFICATION forming part of Letters Patent No. 567,858, dated September 15, 1896.

Application filed May 18, 1896. Serial No. 592,055. (No model.)

*To all whom it may concern:*

Be it known that I, THOMAS C. MADDUX, a citizen of the United States, residing at Carthage, in the county of Smith and State of Tennessee, have invented certain new and useful Improvements in Steam-Cookers; and I do hereby declare the following to be a full, clear, and exact description of the invention, such as will enable others skilled in the art to which it appertains to make and use the same.

This invention relates to certain improvements in steam-cookers.

An object of the invention is to provide a steam-cooker simple, economical, and durable in construction and composed of a minimum number of parts and which can be easily and readily handled and operated, and in which the water can be easily renewed when desired and when the device is in operation.

A further object of the invention is to provide a portable steam-cooker composed of a minimum number of parts and wherein a removable inner vessel is arranged within the main water containing and inclosing vessel and so formed and arranged as to support one or more food-containing vessels in the same horizontal plane, and not one above the other, whereby one food does not become contaminated with the taste and odor of another food and the various food-containing vessels can be easily and separately handled and removed or inserted.

The invention consists in certain novel features of construction and in combinations and arrangements of parts, as more clearly and fully and particularly pointed out and described hereinafter.

Referring to the accompanying drawings, Figure 1 is a vertical section of the cooker, showing several food vessels partially broken away. Fig. 2 is a cross-sectional view, the food vessels being removed. Figs. 3 and 4 show in perspective different forms of food vessels.

In the drawings, $a$ is the main containing vessel, usually cylindrical in shape with a closed bottom and open top provided with a suitable removable cover $a'$ of any suitable form and construction. This vessel contains the water which generates the steam for cooking purposes, and a suitable quantity of water is maintained in the bottom of the vessel to accomplish the objects in view. The water is maintained in suitable quantity in the vessel without removing the cover or disturbing the contents through a side opening $a^2$, arranged a suitable distance above the bottom and provided on the exterior of the vessel with a pocket or nozzle $a^3$, which terminates at its bottom in the water-inlet opening $a^2$, and can be formed by securing a properly bent and formed sheet of metal to the exterior of the vessel. This opening $a^2$ is preferably although not necessarily arranged above the plane of the food-containing vessels hereinafter described. This metal main vessel is provided with suitable internal supports a distance above its bottom, such as the radial inwardly-projecting brackets or rests $a^4$, secured to the inner surface of the vessel, so that their upper edges are arranged in the same horizontal plane which is about, or slightly above, the plane of the surface of the water as it should be maintained in the vessel. A slide $a^5$ can be provided on the exterior of the main vessel to close the water-inlet opening when the cooker is in use.

$b$ is the inner removable vessel, pan, or tray and is slightly less in diameter than the internal diameter of the casing or outer vessel, and has a perforated bottom to permit free circulation of the steam up through said tray and into and around the food vessels resting therein. The removable tray $b$ rests on and is supported by the brackets or supports $a^4$ in the main vessel, and is provided with several vertical handles $b'$, extending upwardly within the main vessel to the open top of the same, so that said tray can be easily lifted from or placed in the main vessel whenever desired and without danger of burning or scalding the operator. The perforated bottom of the tray is provided with suitable supports $b^2$, extending up therefrom at its center and edge at various points around the edge on which the food vessels rest, and by which they are held above the water in the bottom of the main vessel. A single food-containing pan $c$ can be employed, if desired, to removably rest on the supports $b^2$, and where a single pan or vessel is employed it is usually cylindrical in shape and open at the top and of such a diameter as to rest on all of said supports. Where different varieties of small bodies of food are to be cooked a series of sector-shaped pans or vessels $d$ are employed, having closed bottoms and walls and open tops and arranged to rest on certain edge-supports $b^2$, and with the points or apexes of all the pans resting on the central support. In this way different kinds of foods can be cooked at the same time and any pan can be separately removed when desired, and in any case the food is all in the same horizontal plane, and hence the vapors and odors from one do not have to pass up through and into contact with a different food in a higher pan. Material advantages are attained by having the different pans thus arranged in the same horizontal plane, and also by reason of the exceedingly simple and durable and economical construction of the entire device, which is composed of a minimum number of parts, all of which can be easily and readily cleansed separately and completely.

It is evident that various changes might be made in the forms, constructions, and arrangements of the parts described without departing from the spirit and scope of my invention. Hence I do not wish to limit myself to the exact construction disclosed.

Having thus fully described my invention, what I claim as new, and desire to secure by Letters Patent of the United States, is—

The combination of a closed vessel having a side water-inlet opening near its lower portion, and provided with the internal side supports, as $a^4$, a distance above its bottom, a removable perforated tray to rest on said supports having the upwardly-extending handles within the vessel and bottom edge and central rests, and a removable food vessel supported on said rests, substantially as described.

In testimony whereof I affix my signature in presence of two witnesses.

THOMAS C. MADDUX.

Witnesses:
L. A. LIGON,
M. J. MALONE.